J. RATHERAM.
WORK CENTERING DEVICE.
APPLICATION FILED JULY 30, 1918.
1,309,217.
Patented July 8, 1919.
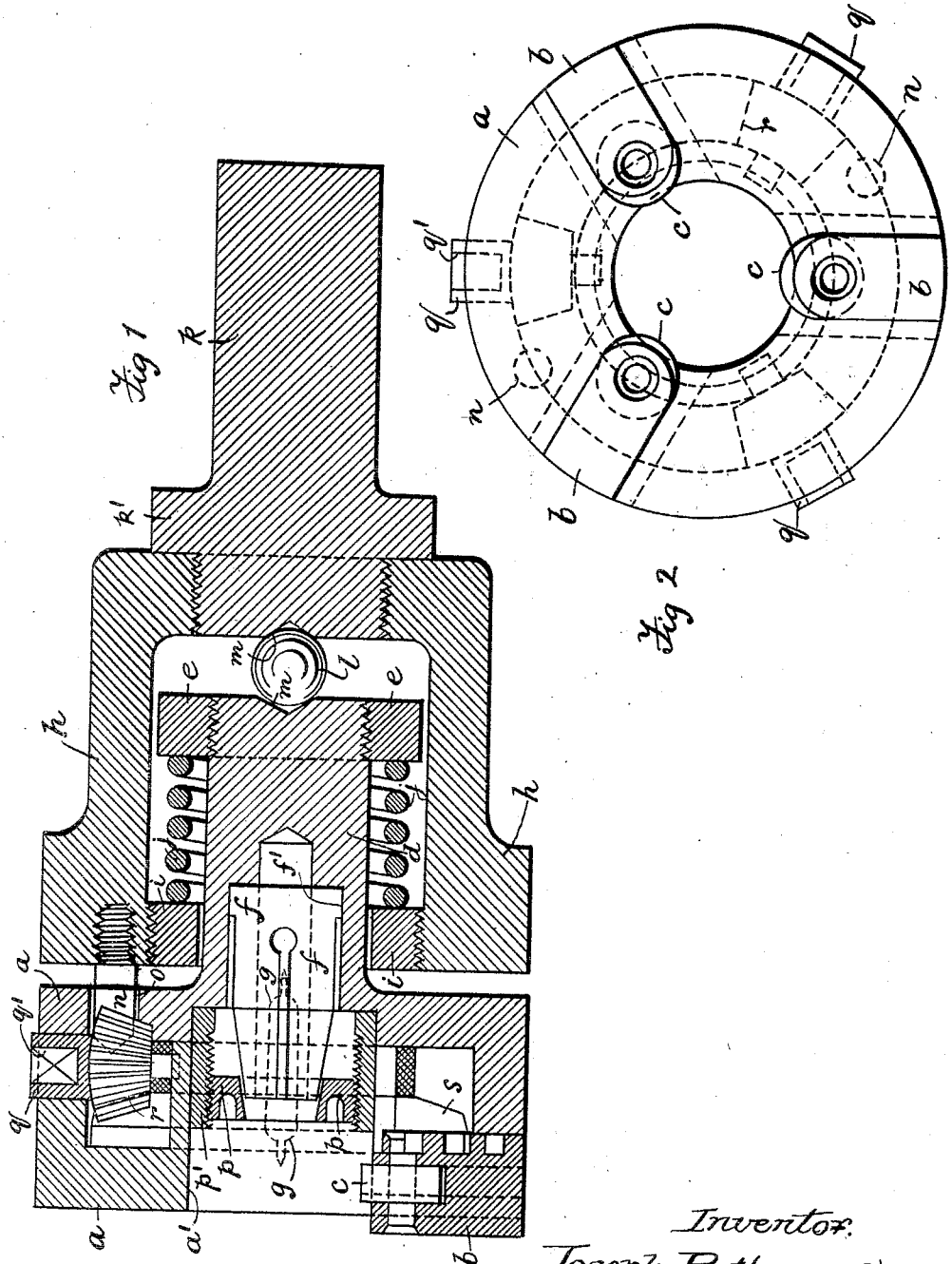
Inventor:
Joseph Ratheram.
By T. Walter Fowler
atty

UNITED STATES PATENT OFFICE.

JOSEPH RATHERAM, OF LONDON, ENGLAND, ASSIGNOR TO BAXTER & CAUNTER, LIMITED, OF LONDON, ENGLAND.

WORK-CENTERING DEVICE.

1,309,217.  Specification of Letters Patent.  Patented July 8, 1919.

Application filed July 30, 1918. Serial No. 247,407.

*To all whom it may concern:*

Be it known that I, JOSEPH RATHERAM, a subject of the King of England, residing at London, England, have invented certain new and useful Improvements in Work-Centering Devices, of which the following is a specification.

This invention relates to an improved work-centering device or device for facilitating the accurate drilling of centers in cylindrical or similar work, sometimes known as "roller-steady centering tools."

According to the present invention, a forward member having a guiding device for the rotating work to be centered and provided also with means for carrying a collet, is employed with a stationary holder member arranged to the rear of the forward member, engagement and retaining means being provided between the two members and the forward member having limited rotary movement and lateral movement relatively to the rear member about a joint between said two members. In operation, the cylindrical or similar work, rotated in any convenient manner, may be passed between rollers journaled in the annular head of the shank-provided forward member. This forward member is, by means of its shank, adapted to project from the stationary holder and it is capable of very limited part-rotation in the stationary holder, but it is capable of oblique or angular movement relatively to the stationary holder (in the manner of a universal joint), between the inner end of the shank of the forward member, and the forward end of a shank or stem fitted to the rear and stationary member. In this way the work can be accurately centered in an expeditious manner and the device can be employed for any machine which requires the work to be centered in a true and accurate manner.

Upon the accompanying sheet of drawings illustrating one form of carrying out the present invention, Figure 1 is a longitudinal section and Fig. 2 a front view.

An annular collar or head *a* is shown provided with three radially arranged slides or jaws *b* carrying rollers *c* which project into the bore of the collar or head *a* at angles apart of 120°. The axes of these rollers *c* are parallel with the bore of the collar *a*. The roller-fitted slides *b* are capable of being simultaneously moved in or out, or of being locked (in the known manner in lathe chucks), so that the rollers *c* can be caused to grip and rotate on cylindrical or circular work which is itself rotated in for instance the headstock of a lathe, and passed through the bore of the head *a* for the purpose of being centered or center-marked.

This annular collar or head *a* is provided with a shank *d* having at the rear a retaining collar *e* screwed thereon. The shank *d* is also fitted at its forward end with a drill-carrying device or collet *f* of the known type. In the drawings, Fig. 1, a suitable double-ended drill *g* is indicated in dotted lines.

The retaining collar *e* upon the shank of this guiding member is passed into a recess in a holder-member *h* having an inwardly extending flange *i* at its forward end. Between this flange *i* and the retaining collar *e* of the shank of the drill-carrying member, is a spiral spring *j* tending to hold the shank in the recessed portion of the holder *h* while leaving space for lateral movement of the shank *d* in the recess.

A stem or shank *k* is screwed into the rear portion of the holder, a collar *k′* on said stem abutting against the exterior of the rear of the holder *h*. Between the front of this stem *k* and the rear of the shank *d* of the forward member, is interposed a spherical ball *l*. A suitable seating *e. g.* of V-section as shown at *m*, is provided for the ball *l* in each of the opposite faces. The spring *j*, as will be understood, keeps by means of the flange *e* the member *d* pressed against the ball *l*. The forward member *a* carrying the drill *g* is thus able to be moved obliquely or angularly upon the ball *l* by reason of the space between the shank *d* and retaining collar *e* of the forward member and the recess and the inturned flange *i* of the holder-member *h*.

The shank *d* of the forward member which passes into the recess of the holder or rear member *h* is normally in line with the shank or stem *k* of the rear member *h*. The forward member *a*, however, by reason of the lateral movement permitted it relatively to the rear member, will enable true centering to be effected even if the work done does not run true.

Projecting from the forward face of the rear or holder member *h* are studs *n* of any desired number and arranged intermediately of the sliding roller-fitted jaws b in the forward member, which studs extend into holes o in the rear face of the forward member a. These holes o are a loose fit for the studs n so that a certain amount of play is provided between the studs fixed to the stationary holder h and the holes in the head a into which they project. A limited amount of part-rotation relatively to the stationary member h, is thus afforded the forward or guiding member a and the angular lateral movement (about the axis of the ball l) is not impeded by the studs n projecting from the holder member h.

Collet f is seated in a recess f' in the forward member a and shank d, and the forward end of the collet passes through a guiding and locking nut p shaped to fit the collet and screwed into a bushing p' which latter is seated in the bore a' of the annular head a. The nut p serves also to secure the drill g in the collet. As a means for adjusting the slides b, I have shown a spindle q fitted with keyhole q' and bevel pinion r meshing with the bevel s and operating in the manner of an ordinary self-centering chuck.

In using this work-centering device, the work may be, for instance, inserted in a lathe chuck and the tool, provided with a suitable drill as g, brought into position in any suitable manner to engage the work by means of the rollers c and to mark the center upon the work as the stem k is pressed up toward the rotating work. The head or collar a by means of the rollers c rides upon the rotating work and accordingly the work can be center-marked or "centered" quite accurately even although the work itself is not exactly centrally held in the chuck.

What I claim is:—

1. A device for work-centering purposes, consisting of a forward member having a guiding device for the rotating work to be centered and having means for carrying a centering drill, a stationary holder member to the rear of said forward member and having means for engaging and retaining the latter, a pivotal joint between said forward and rear members, said forward member having limited rotary movement and limited lateral movement relatively to the rear member about the joint between said two members.

2. A device for work-centering purposes, comprising a stationary holder member, a movable drill-supporting member, means carried by the drill-supporting member for engaging and riding upon the work to be centered, a ball interposed between the drill-supporting member and the stationary holder, the drill-supporting member being pressed against said ball and being capable of part rotation and lateral movement relatively to the stationary holder.

3. A center-marking device for rotating work, comprising a forward member and a rear member, said forward member having adjustable means for guiding the work and means for center-marking said work, said rear member at its front engaging the rear of said forward member, and a ball joint between said forward and rear members to allow oblique movement of the forward member relatively to the rear member.

4. A center-marking device for rotating work, comprising a forward member and a rear member, said forward member having adjustable means for guiding the work and means for center-marking said work, said rear member at its front having means for engaging the rear of said forward member, said engaging means comprising studs projecting from the rear member into holes in the rear of the forward member, the holes being a loose fit for the studs so that a certain amount of play is provided between the forward and rear members, and a ball joint between said forward and rear members to allow oblique movement of the forward member relatively to the rear member.

5. A center-marking device for rotating work, comprising a forward member, an annular head upon said forward member, said head being fitted with roller-provided radial slides adapted to engage and guide the rotating work passed through said annular head, said forward member having means for center-marking said work, a rear member having at its front, means for engaging the rear of the forward member, and a ball joint between said forward and rear members to allow oblique movement of the forward member relatively to the rear member.

6. A center-marking device for rotating work, comprising a forward member having a hollow head and roller-fitted guides projecting radially thereinto, a shank to said forward member, a collet seated in said forward member, a drill in said collet, a collar upon the end of said shank remote from the head of the forward member, a recessed rear member having at front a flange inturned into said recess, said recess being adapted to contain the shank and its collar, leaving however space for lateral movement between said parts and the recessed rear member, a coiled spring around said shank and arranged between said inturned flange and collar, a stem secured to said recessed rear member, a ball between the extremity of said shank and the forward end of said stem, said ball being seated so that the forward member can move obliquely to the axis of the rear member, and studs projecting from the front of the rear member into slots in the rear face of the front member.

7. In a center-marking tool, the combination of a forward member having work-guiding and marking means, said forward member being adapted to rotate to a limited extent on the work to be centered with a rear stationary member, said members being coupled together and normally alined to allow of limited rotary movement between said members, and a ball joint between said members to allow the forward member to move angularly about said ball relatively to the rear member.

In testimony whereof I have affixed my signature in presence of two witnesses.

JOSEPH RATHERAM.

Witnesses:
VICTOR F. FEENY,
FREDERICK FRASER.

Copies of this patent may be obtained for five cents each, by addressing the "Commissioner of Patents, Washington, D. C."